US005524001A

United States Patent [19]

Beaudry et al.

[11] Patent Number: 5,524,001

[45] Date of Patent: Jun. 4, 1996

[54] DYNAMIC CABLE SIGNAL ASSEMBLY

[75] Inventors: Michel Beaudry, Montreal; Michel Dufresne, Boucherville, both of Canada

[73] Assignee: Le Groupe Vidéotron Ltée, Montreal, Canada

[21] Appl. No.: 193,411

[22] Filed: Feb. 7, 1994

[51] Int. Cl.$^6$ .......................... H04L 12/18; H04N 7/025; H04N 7/08

[52] U.S. Cl. .......................... 370/73; 370/94.1; 370/94.2; 348/461; 348/467; 455/3.1

[58] Field of Search .................................. 348/461, 460, 348/465, 467, 473, 6, 7, 12, 17, 468; 370/94.1, 94.2, 110.1, 60, 60.1, 92, 71, 73, 124; 455/3.1, 4.1, 4.2, 6.1, 6.3

[56] References Cited

U.S. PATENT DOCUMENTS

| | | | |
|---|---|---|---|
| 3,889,054 | 6/1975 | Nagel et al. | 348/461 |
| 4,303,941 | 12/1981 | Marti et al. | 348/467 |
| 4,380,027 | 4/1983 | Leventer et al. | 348/467 |
| 5,070,404 | 12/1991 | Bullock et al. | 348/461 |
| 5,347,315 | 9/1994 | Mary et al. | 348/467 |

*Primary Examiner*—Wellington Chin
*Attorney, Agent, or Firm*—Pascal & Associates

[57] ABSTRACT

The present invention relates to a method of data assembly for distribution of the data via a mass audience distribution system, comprised of storing in a random access memory packets of data which are to be transmitted to the audience, storing in a first address table a sequence of memory addresses of the data for transmission of the data in the sequence, progressively reading the first table to retrieve the addresses of those packets of data that are to be transmitted to the audience in the sequence, reading the memory to retrieve the packets of data in the sequence, and transmitting the read packets to the audience in real time.

32 Claims, 2 Drawing Sheets

DYNAMIC CABLE SIGNAL ASSEMBLY

FIELD OF THE INVENTION

This invention relates to a method of data transmission to a mass audience, which is particularly useful for transmitting data to subscribers via a cable TV network or other electronic mass distribution network.

BACKGROUND TO THE INVENTION

Cable TV and other types of electronic mass audience distribution systems such as broadcasting by domestic wireless television stations or via satellite have distributed more than only television signals in recent years. For example, such systems transmit closed caption text for the hard of hearing, that can be decoded by a closed caption decoder, they transmit descrambling codes to be received by pay TV customers of a cable TV system operator, videotext is transmitted and displayed on a TV screen as text or simple graphics files, they download games from a head end which can be played via a TV set, etc. In more recent years, various other services are contemplated or have begun, such as banking, narrowcasting, electronic mail, facsimile broadcast or narrowcasting to individual subscriber stations, etc., all carried via an electronic mass distribution system.

The data which is transmitted typically has several characteristics in common. The data carries a header which contains a fixed or variable address of a particular recipient. In case the recipient is one of a specialized audience group, the header contains a common address of the group. The data is typically transmitted either during the 21st scanning line of a television channel, from where it is decoded by a decoder at the subscriber location, or it is sent in a separate data channel, and is decoded from the data channel at the subscriber location. One system of this kind that broadcasts data is described in U.S. Pat. No. 4,623,920, dated Nov. 18th, 1986, invented by Michel Dufresne et al, and entitled "Cable Network Data Transmission System".

Data to be transmitted is assembled at a head end in a RAMDISK, which is cyclically read in a sequential manner. The data that is read is interspersed with null data, in order to give receiver processors, which are considerably less expensive than the head end processor and thus are much slower in operation, time to process the received data. Null data is also inserted in order to allow a head end processor to insert specialized data into the data stream, such as electronic mail, which is to be transmitted only once to a single subscriber's terminal, in contrast to other data such as program announcements that is transmitted cyclically.

A block diagram of a system of the kind described above is shown in FIG. 1. An information supplier provides data signals which are stored on a hard disk drive of a minicomputer 1 such as a type PDP 11 at a head end. In addition a service provider, using e.g. an IBM compatible personal computer 3 provides data via a modem 5 and telephone line to a front end processor 7. Both the processor 7 and computer 1 are connected in a network 9, such as Ethernet™, to which a main processor 11 is connected. Another personal computer 12 is connected to the network, and is also connected to a RAMDISK 13. RAMDISK 13 is also connected to processor 11.

Computer 12 reads data from computer 1, and from processor 7 and writes it to the RAMDISK 13. Main processor 11 reads the data cyclically and sequentially from RAMDISK 13, and outputs it to digital to analog converter 15, which converts the data to analog form and presents it to modulator 17 for merging with video signals and subsequent transmission to a network 19 to which audience terminals have access.

It is possible for processor 7 to interrupt processor 11 and to cause processor 7 to insert data into the data stream. However, this data can only be inserted as it arrives on the network 9 (i.e. the data can be inserted once), and after the interrupt the processor 11 returns to the cyclic reading of the RAMDISK 13.

With the expected substantial increase in traffic to provide the aforenoted new services, the system shown in FIG. 1 has exhibited substantial problems. A first problem is a limitation in capacity. In order to accommodate an increase in the amount of data to be sent in one cycle, the capacity of the RAMDISK mass storage device must become larger and larger. This increases the read cycle time of the RAMDISK, and slows down to an unacceptable degree the responsiveness of the system to, for example, commands sent upstream requesting a service, such as an update report on a bank balance, (for example, delays of 20 seconds to provide a response have been experienced), or the updating of closed captioning (which could unacceptably lag the accompanied story being shown on television).

Secondly, the cyclic operation requires the insertion of null data on the RAMDISK in order to accommodate the aforenoted insertion of data during the null data. The use of null data imposes an inherent limitation on the capacity of the system. No more insert data can be accommodated than the capacity of the null portions of the signals, and the more null data stored on the RAMDISK, the less cyclic data can be transmitted.

Thirdly, the above-described system cannot prioritize data signals that are to be sent on a cyclic basis. For example, if an emergency signal is to be broadcast on a cyclic schedule, it must be written to the RAMDISK. This takes time. If the reading of the RAMDISK has just passed the memory location where the emergency signal has just been written, it could take the reading time of the entire RAMDISK (e.g. 20 seconds for a large system) before the emergency signal is read and transmitted. This could result in tragic consequences if the emergency is, for example, a missile alert, warning of a tidal wave or earthquake, etc.

Further, the above-described system cannot accommodate different data signals that are to be transmitted synchronously at different frequencies.

SUMMARY OF THE INVENTION

The present invention is a system which overcomes the above-described problems and limitations. The present invention can transmit signals on any cyclic or noncyclic schedule, without limitation as to the capacity of a RAMDISK, and can transmit a signal any predefined number of times.

In accordance with the present invention, data to be transmitted is assembled into packets for transmission in real time, "on the fly". Each packet has, in effect, its own defined cycle, and it is transmitted in accordance with that definition.

In accordance with an embodiment of the invention, a method of data distribution to an audience is comprised of storing packets of data in a random access memory, storing a transmission characteristic for each packet, reading the characteristics and transmitting each packet to the audience in accordance with a frequency and timing depending on its particular characteristic.

In accordance with another embodiment, a method of data assembly for distribution of the data via a mass audience distribution system, is comprised of storing in a random access memory packets of data which are to be transmitted to the audience, storing in a first address table a sequence of memory addresses of the data for transmission of the data in the sequence, progressively reading the first table to retrieve the addresses of those packets of data that are to be transmitted to the audience in the sequence, reading the memory to retrieve the packets of data in the sequence, and transmitting the packets read from the memory to the audience in real time.

In accordance with another embodiment, the method includes the step of storing a second packet characteristic table which contains a record for each of the packets stored in the memory, each record including a priority field and a repetition period field, reading the second table at least once each interval of time defining a packet, and updating the first table at least once each time the first table is read to specify the memory addresses in the first table in accordance with priority data stored in the priority field and repetition data stored in the repetition field of the second table for each packet of data.

In accordance with another embodiment, the method includes reading incoming data, determining a required priority and repetition frequency, if any, of the incoming data, packetizing the incoming data if it is not packetized, and in which the storing steps include storing packets of data in the random access memory, updating the second table with data records relating to each of said packets for which priority and repetition frequency were determined, and updating the first table under control of the data stored in the second table.

BRIEF INTRODUCTION TO THE DRAWINGS

A better understanding of the invention will be obtained by a consideration of the detailed description below of a preferred embodiment, with reference to the following drawings, in which.

DETAILED DESCRIPTION OF THE INVENTION

Figure 1:
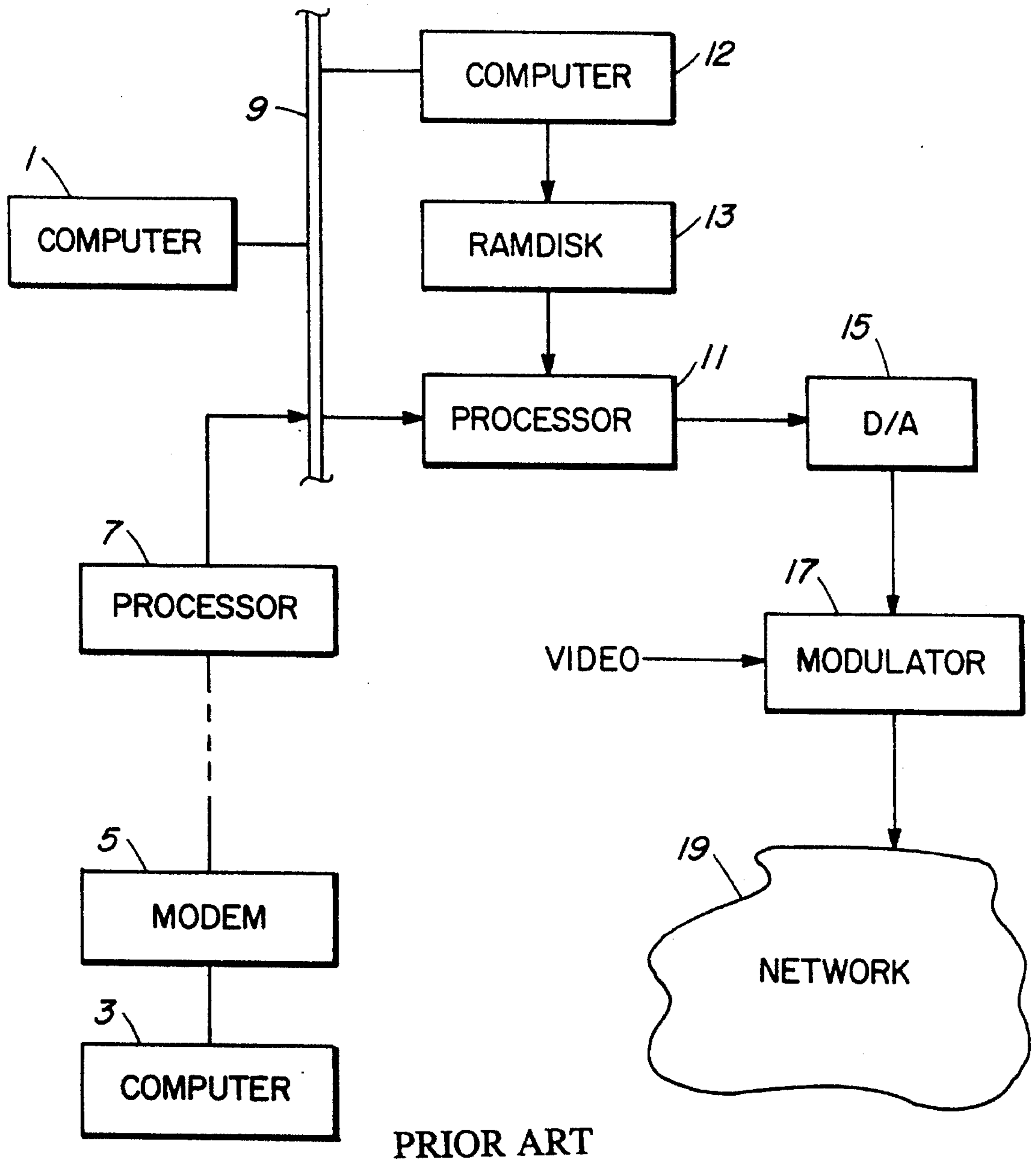
PRIOR ART FIG. 1
FIG. 1 is a block diagram of a system in accordance with the prior art.

Data to be transmitted is received on data input lines DATA 1, DATA 2, DATA 3, etc. by a multiplexer 30, which is under control of a microprocessor 32. Microprocessor 32 reads the data and segregates the data into packets. The data that is read by microprocessor 32 has been prepared by an information provider to contain information relating to the broadcast parameters, such as priority, frequency of transmission. This can include a data payload which designates this information, or can be merely a "contents" byte or bytes which, upon reading by the processor, causes it to access a lookup table in an associated memory 39 which stores the broadcast parameters and can supply the parameters data when the processor recognizes particular "contents" bytes.

Upon processing the input data into packets, the processor 32 stores the packets 36 in random access memory (RAM) 38. The parameter data is stored in a table 39 in RAM 40. The table in RAM 40 preferably stores, in a record for each packet, data values designating priority, a repetition period, linking data (indicating whether the packet to be broadcast is related to another identified packet on a time frame basis), time span between the packet and the one identified by the linking data, the number of transmissions for the packet, and, if desired, an internal identifier of a channel number on which the packet is to be broadcast. The record also stores in the table a pointer to the address in RAM 38 where the packet starts.

The processor 32, having established the data in the table of RAM 40, establishes from that data another table 42 in RAM 38 which is a list of beginning or complete addresses of packets 36 which are to be transmitted in sequence. For example, if one packet is to be transmitted several times during the reading time of table 42 as designated by the parameters stored in the record for that packet in table 39, the address of the beginning of that packet in RAM 38 is placed in table 42 several times, spaced by the spacing parameter indicated in the record for that packet in table 39.

Data assembler 44 reads each entry in table 42 in RAM 38 sequentially, accesses the packet addresses, and reads the packets at the designated addresses, transmitting the data to a digital to analog converter 46 or other device which converts the data packets into a form for transmission (e.g. a phase shift modulator). The data is then sent to a master modulator 48, which inserts the data signals into a proper channel, frequency multiplexing it with video channels, and transmits the multiplexed signals over a medium 50 to subscribers stations 51.

While table 42 of RAM 38 is being read, processor 32 should assemble another table to replace table 42 as soon as it has been read. Or, rather than assembling a complete table to replace the entire table 42, once individual entries of table 42 have been read, substitute entries can be placed into their memory locations so that after the table has been read, it can be read from the beginning again and the subsequent reading will cause a different sequence of packets to be read into data assembler 44.

Of course, data assembler 44 can be a receiver of packets instead of a reader of packets in RAM 38, and a processor associated with RAM 38, even processor 32 if it is sufficiently fast enough and has enough time capacity, can read the packet addresses and the packet data in table 42 and provide the packets in the sequence designated by the order of addresses in table 42 to the data assembler 44.

Processor 32 thus reads table 39 and constructs table 42. It must be a fast enough processor to be able to read table 39 at a frequency of at least once per packet interval. A type 68030 or 68040 processor has been found to work adequately for in a prototype system.

In this invention, therefore, instead of assembling data as a cyclically read RAMDISK, data is assembled into a sequence from a table of pointers to data packets already assembled in RAM 38, and stored in no particular order other than memory locations chosen by the writing processor. Once reading of the table has been exhausted, in one embodiment a new table is created and put into RAM, or, as described above, in another embodiment table entries already read can be replaced in preparation for the following progressive reading of the table of pointers. Packets which are required to be read only once, or which have been read as many times as the parameters in table 39 have designated, can be written over with new packets when processor 32 creates new packets and stores them in memory 38.

It will be understood that the various random access memories that store the packets and the tables can be combined if desired in any convenient manner, and the various processors can be a single processor or plural processors which perform the various functions. For instance several processors can be used, one to read the incoming data and determine the priority, frequency of transmission, etc., and create and write the packets to RAM 38, and write table 39. Another processor can read table 39 and create table 42. Another processor can read table 42, read the packets 36 at the designated addresses read from table 42, and provide them to data assembler 44, etc.

Figure 3:
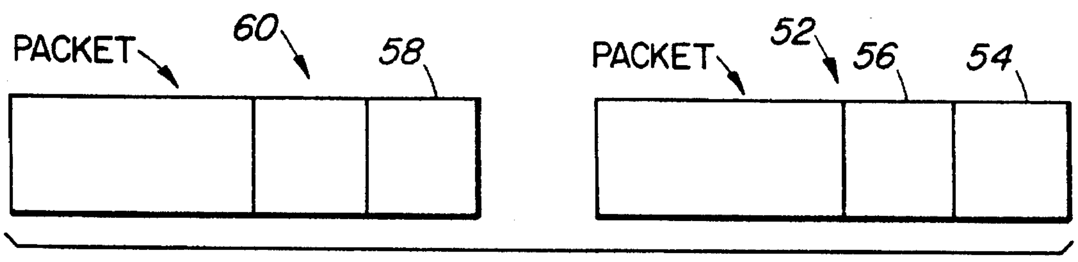
FIG. 3 is an illustration of packets stored in a memory of the invention.
Figure 2:
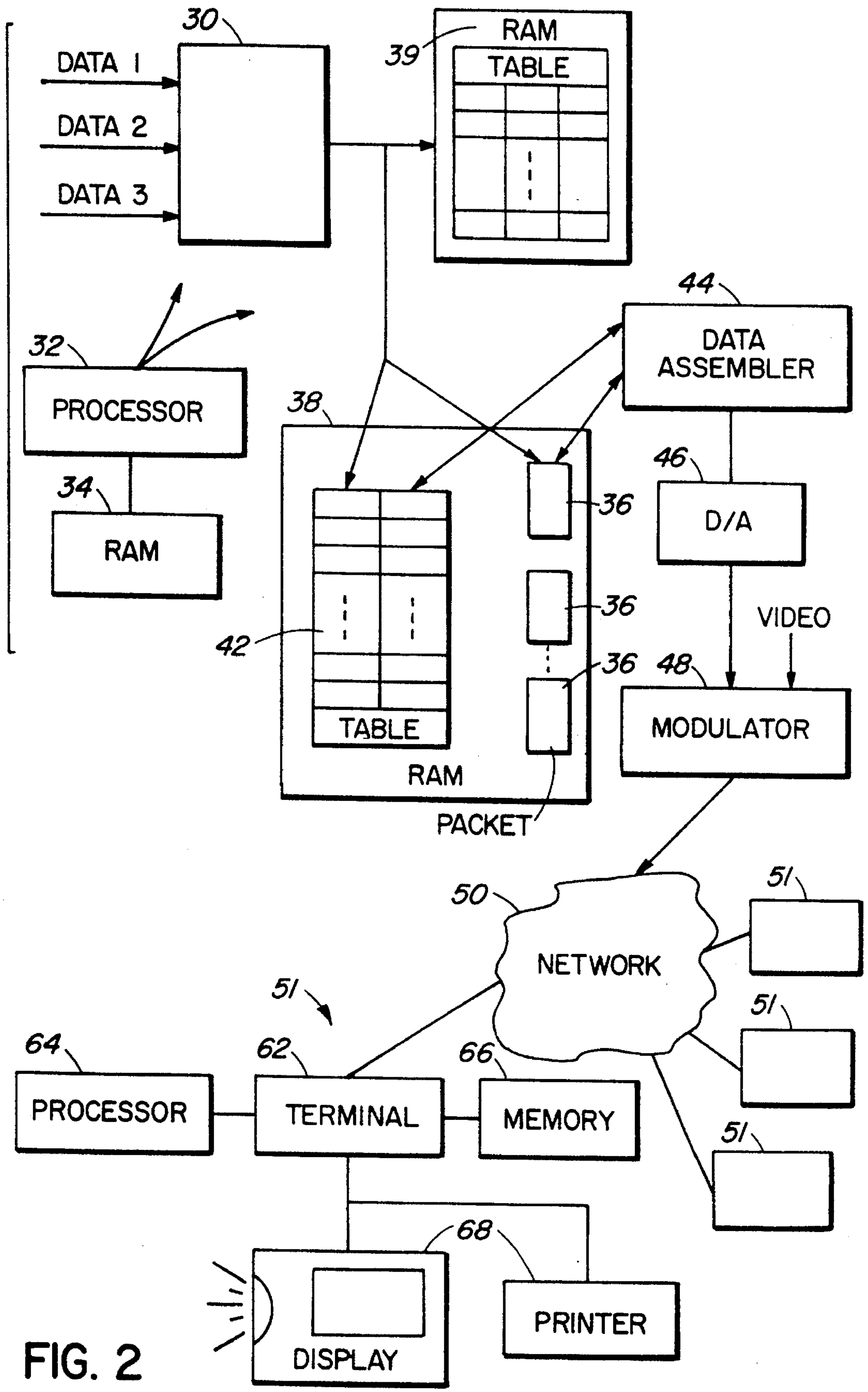
FIG. 2 is a block diagram of a system in accordance with a preferred embodiment of this invention.

It is preferred that the packets themselves should contain a header that includes a reference to a following packet in a sequence. Thus for example as shown in FIG. 3, packet 52 should contain in its header, not only an identifier byte 54 of that packet, but also a reference byte 56 to an identifier byte 58 of a following packet in sequence of meaningful data. Thus for example, there could be several intervening packets between packet 52 and packet 60 which carry data which have no content relationship to packets 52 and 60, and thus the reference byte 56 ties packets 52 and 60 together with regard to content. This allows a subscriber terminal 62 to receive the data, and under control of a local processor 64 detect the identifier bytes and reference bytes of successive packets, store them in a local memory 66, assemble related packets in sequence for transmission to a display 68 and/or audio amplifier for provision to a subscriber, since a preceding packet in effect carries a linking address of the next packet in line having related content.

The present invention can be more economical in memory and processor usage if table 42 merely stores the address of a first packet in a sequence, and not the addresses of other packets in the sequence. In that case once the first packet has been read for transmission to data assembler 44, the address in RAM 38 of the beginning of the following packet of the sequence can be read from the identifier 56 carried by the preceding packet. The packet at that address is read, and from its identifier byte 56 the address in RAM 38 of the next packet in the sequence can be determined, and the packet at that address read, and so on, until a null identifier byte is read. At that point the controlling processor can read the next record in table 42 to obtain the address of the packet in the next sequence to be sent.

Since the present invention assembles data for transmission on a real time basis, creates a sequence of data that has no cyclic relationship to the capacity of a RAMDISK, can create the sequence of data with full regard to the priority of each packet, a required frequency of transmission (including a limitation in the number of times a packet or sequence of packets is transmitted), and can precisely control the timing of transmission of each packet, the invention can adjust the timing of packets to suit the ability of receivers to receive and process packets. Instead of the entire content of a RAMDISK being transmitted in a cyclic manner as in the prior art, in the present invention each data packet can have its own cycle and each data packet can have its own lifetime.

Groups of packets can now be cycled in accordance with their own parameters, linking, priority and inter-packet interval. Packets can be synchronized, and can be put into phase, if desired. Patterns of packets can be transmitted which patterns themselves can carry information (a simple example is synchronization to carry timing information for a particular sequence of packets).

In case a small delay is experienced in transmitting a repeatable packet, the system can correct for it in a following transmission. In case a delay is experienced, all of the packets in a sequence can be time shifted to repeat an inter-packet interval, i.e. to correct for the delay.

Because the data is assembled in real time, there is no concern about pages of data as existed in the prior art systems, which had limitations of page size based on the RAMDISK size, with excess capacity filled with null data. Null data was required to be read to determine that it is indeed null data, which slowed down speed of operation of the system. Null data is not required in the present invention, an emergency data can be inserted into RAM 38 and transmitted immediately without waiting for null data of a RAMDISK to be read at some unknown time, since in the present invention the RAM addresses of data packets to be transmitted can be inserted at any location in table 42, for immediate, timed or repeated transmission.

In addition, because the data packets in the present invention are read designated by pointers from a table, it is a relatively easy task to remove a single packet from a sequence to be transmitted, whereas it was both difficult and time consuming in prior art systems.

A person skilled in the art having read this specification may now design variations and other embodiments using the principles described herein. All are considered to be within the scope of this invention as defined in the claims appended hereto.

We claim:

1. A method of data assembly for distribution of said data via a mass audience distribution system, comprising:

a) storing in a random access memory packets of data which are to be transmitted to the audience, b) storing in a first address table a sequence of various memory addresses of said data for transmission of the data in the sequence of the stored memory addresses, c) progressively reading the first table to retrieve the addresses of those packets of data that are to be transmitted to the audience in the sequence, d) reading said memory at locations defined by the sequence of addresses to retrieve the packets of data in the sequence, e) transmitting the read packets to the audience in real time, f) storing a second packet characteristic table which contains a record for each of the packets stored in the memory, each record including a priority field and a repetition period field, g) reading the second table at least once each interval of time defining a packet, and h) updating the first table at least once each time the first table is read to specify said memory addresses in the first table in accordance with priority data stored in the priority field and repetition data stored in the repetition field of the second table for each packet of data.

2. A method as defined in claim 1 further including reading incoming data, determining a required priority and repetition frequency, if any, of the incoming data, packetizing the incoming data if it is not packetized, and in which the storing steps include storing packets of data in the random access memory, updating the second table with data records relating to each of said packets for which priority and repetition frequency were determined, and updating the first table under control of the data stored in the second table.

3. A method as defined in claim 2 including transmitting packets to the audience with an address header and a data load and including the additional step of detecting at least one predetermined address header at a receiver and storing the data load of the packet having the predetermined address header in a local memory.

4. A method as defined in claim 3 including detecting a sequence of packets containing similar, corresponding or associated address headers, retaining data loads of each of the similar, corresponding or associated packets, and assembling the retained data loads into a complete data sequence.

5. A method as defined in claim 2 including modulating the packets of data on a first carrier, and transmitting the modulated carrier with at least one television signal to the audience via a broadcast medium.

6. A method as defined in claim 5 in which the modulated carrier is a video carrier, the data being carried during a data channel interval of the television signal.

7. A method as defined in claim 6 in which said data channel interval is during the 21st scanning line of a television picture.

8. A method as defined in claim 5 in which the modulated carrier has a frequency of a separate television channel.

9. A method as defined in claim 5 in which the modulated carrier has a frequency of a tunable data channel.

10. A method as defined in claim 2, including attaching an address header to a data load of each packet to be transmitted, modulating different packets of data on plural radio frequency carriers, detecting predetermined address headers at a receiver, and assembling data loads of plural received packets having said predetermined address headers from said plural carriers into a complete data sequence.

11. A method as defined in claim 10 in which the plural carriers are in respective different television channels.

12. A method as defined in claim 2 in which each record contains, in addition to the priority and repetition fields, additional fields designating linkage of packets on a time frame basis, time spacing of packets, and number of required transmissions of a packet.

13. A method of data assembly for distribution of said data via a mass audience distribution system, comprising:

a) storing in a random access memory packets of data which are to be transmitted to the audience, b) storing in a first address table a sequence of various memory addresses of said data for transmission of the data in the sequence of the stored memory addresses, c) progressively reading the first table to retrieve the addresses of those packets of data that are to be transmitted to the audience in the sequence, d) reading said memory at locations defined by the sequence of addresses to retrieve the packets of data in the sequence, e) transmitting the read packets to the audience in real time, and f) transmitting packets to the audience with an address header and a data load and including the additional step of detecting at least one predetermined address header at a receiver and retaining the data load in a local memory.

14. A method as defined in claim 13 including detecting a sequence of packets containing similar address headers, retaining data loads of each of the packets, and assembling the retained data loads into a complete data sequence.

15. A method of data assembly for distribution of said data via a mass audience distribution system, comprising:

a) storing in a random access memory packets of data which are to be transmitted to the audience, b) storing in a first address table a sequence of various memory addresses of said data for transmission of the data in the sequence of the stored memory addresses, c) progressively reading the first table to retrieve the addresses of those packets of data that are to be transmitted to the audience in the sequence, d) reading said memory at locations defined by the sequence of addresses to retrieve the packets of data in the sequence, e) transmitting the read packets to the audience in real time, f) attaching an address header to a data load of each packet to be transmitted, g) modulating different packets of data on plural radio frequency carriers, h) detecting predetermined address headers at a receiver, and i) assembling data loads of plural received packets having said predetermined address headers from said plural carriers into a complete data sequence.

16. A method as defined in claim 15 in which the plural carriers are in respective different television channels.

17. A method of data distribution comprising storing packets of data in a random access memory, storing a transmission characteristic for each packet of said packets of data, reading said characteristics and transmitting each packet to an audience in accordance with a frequency and timing depending on its particular characteristic.

18. A method of data distribution as defined in claim 17, comprising:

a) storing in a first table memory addresses of said packets of data, b) reading the first table to retrieve the addresses of those packets of data that are to be transmitted to the audience in sequence, c) reading said memory to retrieve the packets of data in the sequence, and d) transmitting the read packets to the audience in real time.

19. A method as defined in claim 18, including the step of storing a second packet characteristic table which contains a record for each of the packets stored in the memory, each record including a priority field and a repetition period field, reading the second table at least once each packet interval, and updating the first table at least once each packet interval to specify said memory addresses in the first table in accordance with priority data stored in the priority field and repetition data stored in the repetition field for each packet of data.

20. A method as defined in claim 19 in which both said storing steps are comprised of reading incoming data, determining a required priority and repetition frequency, if any, of the incoming data, packetizing the incoming data if it is not packetized, storing packets of data in the random access memory, updating the second table with data records relating to each of said packets for which priority and repetition frequency were determined, and updating the first table after it has been read.

21. A method as defined in claim 17, including storing in each packet a packet address, storing in each packet the packet address of a following related packet, detecting the packet address of a packet at a receiving station, determining from the packet the address of a following related address, and detecting a particular following packet by detecting its packet address as designated by a preceding related address carried in a preceding packet.

22. A method of data distribution comprising storing packets of data in a random access memory, dynamically assembling the stored packets of data into a data stream, transmitting said data stream, and repeating transmission of some of the packets in the data stream in a cyclic manner.

23. A method of data distribution as defined in claim 22 including repeating transmission of others of the packets in further cyclic manner in which further transmission cycles of said others of the packets have different periods and are repeated at different intervals than said some of the packets, cycles of said some of the packets and said others of the packets being dynamically multiplexed.

24. A method as defined in claim 23 in which said packets are read from said memory dynamically in a programmable order to form said cycles.

25. A method as defined in claim 23 in which cycles of some of said others of the packets are nested within a cycle of said some of the packets.

26. A method as defined in claim 23 including synchronizing cycles of several of said others of the packets.

27. A method as defined in claim 23, including transmitting at least one of the cycles of said others of the packets on at least one different channel than a cycle of said some of the packets.

28. A method as defined in claim 27, including modulating the cycles of packets for transmission on different carriers for transmission on different tunable data channels, and transmitting the modulated carriers via a broadcast medium.

29. A method as defined in claim 23, including transmitting of said cycles on a single channel up to the capacity of said single channel, and dynamically transmitting at least one of said cycles of said others of the packets on a different channel in the event of a requirement to transmit packets in excess of the capacity of said single channel.

30. A method as defined in claim 23 including cyclically transmitting a series of cycles of said others of the packets.

31. A method as defined in claim 22 including modulating the packets of data on a first carrier, and transmitting the modulated carrier to an audience via a broadcast medium.

32. A method as defined in claim 31 in which the modulated carrier has a frequency of a tunable data channel.

* * * * *